United States Patent
Iikawa et al.

(10) Patent No.: US 6,888,690 B2
(45) Date of Patent: May 3, 2005

(54) HOT CRIMPING STRUCTURE AND METHOD FOR FIXING A LENS TO A LENS FRAME, AND HOT CRIMPING TOOL THEREFOR

(75) Inventors: Makoto Iikawa, Saitama (JP); Masashi Takahashi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/745,508

(22) Filed: Dec. 29, 2003

(65) Prior Publication Data

US 2004/0136090 A1 Jul. 15, 2004

(30) Foreign Application Priority Data

Jan. 7, 2003 (JP) ...................................... 2003-001503

(51) Int. Cl.$^7$ ................................................ G02B 7/02
(52) U.S. Cl. ...................................... 359/819; 359/820
(58) Field of Search ............................... 359/819, 820, 359/811, 694

(56) References Cited

U.S. PATENT DOCUMENTS

| | | | | |
|---|---|---|---|---|
| 5,557,474 A | * | 9/1996 | McCrary | 359/820 |
| 5,798,876 A | * | 8/1998 | Nagano | 359/819 |
| 5,808,817 A | * | 9/1998 | Miyamoto et al. | 359/819 |
| 6,108,145 A | * | 8/2000 | McCrary | 359/820 |
| 6,144,509 A | * | 11/2000 | Baker | 359/819 |
| 6,198,579 B1 | * | 3/2001 | Rupp | 359/820 |
| 6,215,604 B1 | * | 4/2001 | Hori | 359/819 |
| 6,392,825 B1 | * | 5/2002 | Trunz et al. | 359/819 |
| 6,441,976 B1 | * | 8/2002 | Okorocha | 359/820 |

FOREIGN PATENT DOCUMENTS

| | | |
|---|---|---|
| JP | 7-43574 | 2/1995 |
| JP | 11277533 | 10/1999 |
| JP | 2002-189160 | 7/2002 |

* cited by examiner

*Primary Examiner*—Loha Ben
(74) *Attorney, Agent, or Firm*—Greenblum & Bernstein, P.L.C.

(57) ABSTRACT

A hot crimping structure for fixing at least one lens element to a lens frame made of synthetic resin, the lens element being accommodated in a lens holder opening of the lens frame, a portion of the lens frame being crimped by heat to serve as a crimped edge which lies on a surface of the lens element adjacent to a rim of the lens element. The lens frame includes an outward expansion surface which extends outwards from a close vicinity of the rim of the lens element. A hot crimping tool is brought into contact with the outward expansion surface to form a recess on the outward expansion surface by heat, to thereby produce the crimped edge by movement of melting synthetic resin which is melted due to the formation of the recess.

11 Claims, 7 Drawing Sheets

HOT CRIMPING STRUCTURE AND METHOD FOR FIXING A LENS TO A LENS FRAME, AND HOT CRIMPING TOOL THEREFOR

BACKGROUND OF THE INVENTION

1. Field of the Invention

The present invention relates to a hot crimping (thermal caulking structure) structure fixing a lens to a lens frame, and also relates to a hot crimping method of fixing a lens to a lens frame. The present invention further relates to a hot crimping tool for fixing a lens to a lens frame.

2. Description of the Related Art

A hot crimping method is often adopted to fix a lens (a lens element or a lens group) to a cylindrical lens frame made of synthetic resin. According to a conventional hot crimping method, a lens holder opening with a diameter corresponding to the diameter of the lens is formed on a lens frame, a stepped portion which is engaged with the rim of the lens is formed on an inner peripheral surface of the lens frame in the lens holder opening, and a thin-walled cylindrical portion is formed on the lens frame adjacent to the lens holder opening so that the lens is fixed to the lens frame by crimping the edge of the thin-walled cylindrical portion by heat in a direction radially inwards from the outside of the thin-walled cylindrical portion to bring the edge into intimate contact with an outer edge of the lens. The hot crimping tool (hot crimping horn) for this crimping operation is used in a manner to bring an inner conical surface, which is formed on an inner peripheral surface of the hot crimping tool, into contact with an outer peripheral surface of the thin-walled cylindrical portion.

Such a conventional hot crimping structure has been devised based on a technological common sense of preventing the hot crimping tool from contacting with any portion of the lens frame other than the thin-walled cylindrical portion. If the hot crimping tool accidentally contacts a portion other than the thin-walled cylindrical portion, there is a high possibility of the lens frame or a peripheral part thereof being unexpectedly deformed by heat.

The conventional hot crimping structure needs to be provided with not only the aforementioned thin-walled cylindrical portion but also a clearance recess for the hot crimping tool. This adds constraints to the shape of the lens frame, and increases the size of the lens frame. On the other hand, if the axis of the rotationally symmetrical hot crimping tool is not precisely coincident with the optical axis of the lens when brought into contact with the thin-walled cylindrical portion, the thin-walled cylindrical portion is not deformed uniformly. This may cause a poor crimping of the thin-walled cylindrical portion, so that the lens cannot be held properly by the lens frame.

SUMMARY OF THE INVENTION

The present invention has been devised in view of the above described problems which reside in a conventional hot crimping structure. The present invention provides a hot crimping structure for fixing a lens to a lens frame and a hot crimping method of fixing a lens to a lens frame, wherein the lens frame does not have to be provided with either the aforementioned thin-walled cylindrical portion or any special clearance recess for the hot crimping tool; moreover, the degree of precision in alignment of the axis of the hot crimping tool and the optical axis of the lens can be reduced.

The present invention further provides a hot crimping tool for fixing a lens to a lens frame, wherein the hot crimping tool does not require the lens frame to be provided with a clearance recess for the hot crimping tool.

According to an aspect of the present invention, a hot crimping structure is provided for fixing at least one lens element to a lens frame made of synthetic resin, the lens element being accommodated in a lens holder opening of the lens frame, a portion of the lens frame being crimped by heat to serve as a crimped edge which lies on a surface of the lens element adjacent to a rim of the lens element. The lens frame includes an outward expansion surface which extends outwards from a close vicinity of the rim of the lens element. A hot crimping tool is brought into contact with the outward expansion surface to form a recess on the outward expansion surface by heat, to thereby produce the crimped edge by movement of melting synthetic resin which is melted due to the formation of the recess.

It is desirable for the outward expansion surface to lie in a plane orthogonal to an axis of the lens element.

It is desirable for the outward expansion surface to be formed as a substantially truncated conical surface which is rotation-symmetrical about an axis of the lens element.

It is desirable for the lens frame to include a stop portion formed on an inner peripheral surface of the lens frame in the lens holder opening, and the rim of the lens element is held tight between the crimped edge and the stop portion.

It is desirable for the recess to be formed as an annular recess on the outward expansion surface so that the crimped edge is produced as an annular crimped edge.

The lens frame can include another lens holder opening provided adjacent to the lens holder opening, the another lens holder opening having a diameter greater than a diameter of the lens holder opening. Another lens element having a diameter greater than a diameter of the lens element can be accommodated in the another lens holder opening.

In another embodiment, a hot crimping method of fixing at least one lens element to a lens frame made of synthetic resin is provided, a lens holder opening for accommodating the lens element being formed on the lens frame, an inward stepped portion which is engaged with that portion of one side surface of the lens element adjacent to a rim of the lens being formed on the lens frame in the lens holder opening, a portion of the lens frame being crimped by heat to serve a crimped edge which lies on the portion of the other side surface of the lens element adjacent to the rim of the lens element. The hot crimping method includes forming an outward expansion surface on an inner peripheral surface of the lens frame so that the outward expansion surface extends outwards from a close vicinity of the rim of the lens element; preparing a hot crimping tool including an annular crimping edge having an acute angle in cross section, an outer diameter of the annular crimping edge being greater than a diameter of the lens holder opening; and bringing the hot crimping tool into contact with the outward expansion surface to form a recess on the outward expansion surface by heat of the hot crimping tool to thereby produce the crimped edge by movement of melting synthetic resin which is melted due to the formation of the recess.

It is desirable for the outward expansion surface to lie in a plane orthogonal to an axis of the lens element.

It is desirable for the outward expansion surface to be formed as a substantially truncated conical surface which is rotation-symmetrical about an axis of the lens element.

In another embodiment, a hot crimping tool for fixing at least one lens element to a lens frame made of synthetic resin, the lens element being accommodated in a lens holder opening of the lens frame, the hot crimping tool being brought into contact with a portion of the lens frame to crimp the portion by heat of the hot crimping tool so as to produce a crimped edge which lies on a surface of the lens element adjacent to a rim of the lens element. The hot crimping tool includes an annular crimping edge which is formed at an end of the hot crimping tool to have an acute angle in cross section. The annular crimping edge is inserted into the lens frame in a direction substantially orthogonal to a radial direction of the lens frame, and is brought into contact with the portion of the lens frame to form a recess to thereby produce the crimped edge by a movement of a melting synthetic resin which is melted due to the formation of the recess.

It is desirable for the hot crimping tool to be rotationally symmetrical about an axis of the lens element.

The present disclosure relates to subject matter contained in Japanese Patent Application No.2003-001503 (filed on Jan. 7, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
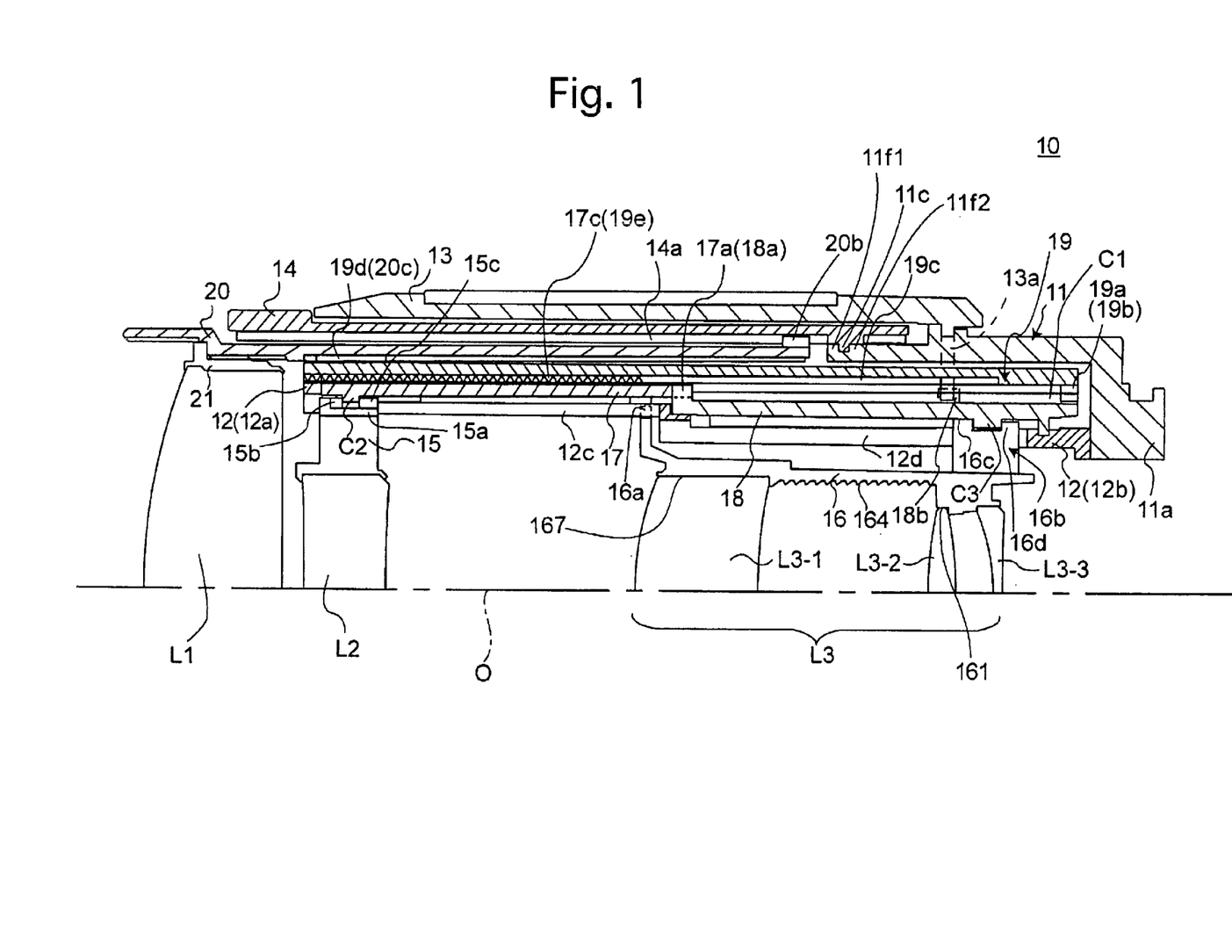
FIG. 1 is a longitudinal cross sectional view of an embodiment of an interchangeable zoom lens which incorporates a hot crimping structure according to the present invention, showing an upper half of the zoom lens from the optical axis thereof.

FIG. 1 shows an embodiment of an interchangeable zoom lens of a camera system, wherein the zoom lens incorporates a hot crimping structure (thermal caulking structure) according to the present invention. First the overall structure of the zoom lens 10 will be discussed hereinafter. The zoom lens 10 is provided with a photographing optical system having three lens groups, i.e., a first lens group L1, a second lens group L2 and a third lens group L3 as shown in FIG. 1. In this photographing optical system, the first, second and third lens groups L1, L2 and L3 move along an optical axis O to perform a zooming operation, and the first lens group L1 moves along the optical axis O to perform a focusing operation.

The zoom lens 10 is provided with a mount ring (stationary ring) 11. The mount ring 11 is provided at a rear end thereof with a mounting portion 11a which is detachably attached to a camera body (not shown). The zoom lens 10 is provided inside the mount ring 11 with a stationary ring 12 which is fixed to the mount ring 11. The zoom lens 10 is provided around the mount ring 11 with a focus ring 14, and is provided around the focus ring 14 with a zoom ring 13. The zoom ring 13 and the focus ring 14 are supported by the mount ring 11 to be freely rotatable about the optical axis O without moving along the optical axis O with respect to the mount ring 11.

Figure 2:
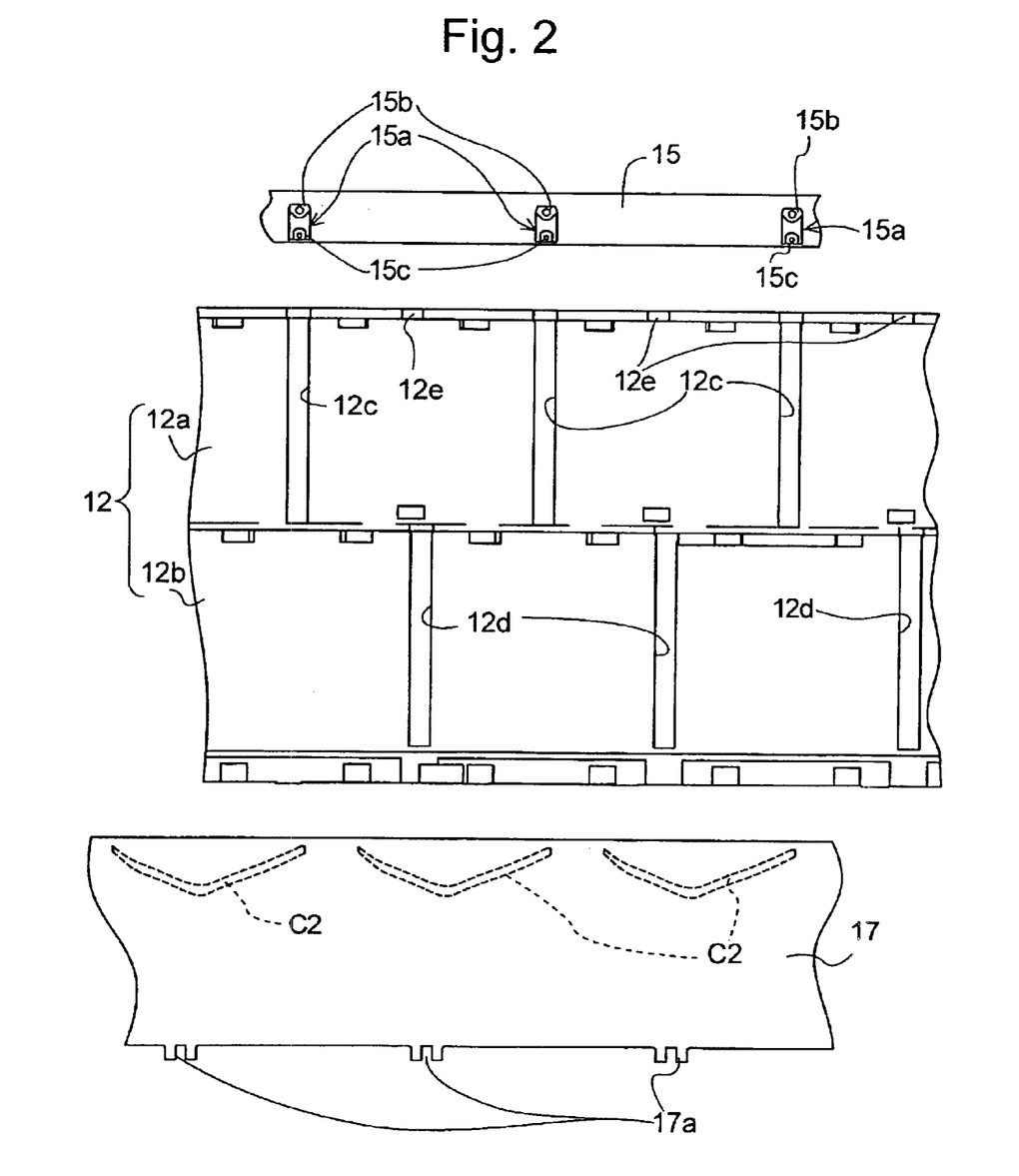
FIG. 2 is an exploded and developed view of a second lens group support ring, a stationary ring and a first cam ring of the zoom lens shown in FIG. 1.

The stationary ring 12 is provided with a front large-diameter portion 12a and a rear small-diameter portion 12b positioned behind the front large-diameter portion 12a. The front large-diameter portion 12a is, provided with three front linear guide slots 12c extending parallel to the optical axis O, while the rear small-diameter portion 12b is provided with three rear linear guide slots 12d extending parallel to the optical axis O. The second lens group L2 is fixed to a second lens group support frame 15 to be supported thereby. The second lens group support frame 15 is fitted into the front large-diameter portion 12a. The second lens group support frame 15 is provided on an outer peripheral surface thereof with three linear guide projections 15a which project radially outwards to be slidably engaged in the three front linear guide slots 12c of the front large-diameter portion 12a, respectively (see FIG. 2). Accordingly, the second lens group support frame 15 is guided linearly in the optical axis direction without rotating about the optical axis O with respect to the stationary ring 12 due to the engagement of the three linear guide projections 15a with the three front linear guide slots 12c. The third lens group L3 is fixed to a third lens group support frame 16 to be supported thereby. The third lens group support frame 16 is fitted into the rear small-diameter portion 12b. The third lens group support frame 16 is provided at the front end thereof with three first linear guide projections 16a which project radially outwards to be slidably engaged in the three rear linear guide slots 12c of the front large-diameter portion 12a, respectively, and is further provided in the vicinity of the rear end thereof with three second linear guide projections 16b which project radially outwards to be slidably engaged in the three rear linear guide slots 12d on the rear small-diameter portion 12b. Accordingly, the third lens group support frame 16 is guided linearly in the optical axis direction without rotating about the optical axis O with respect to the stationary ring 12 due to the engagement of the three linear guide projections 16a with the three front linear guide slots 12c and the engagement of the three second linear guide projections 16b with the three rear linear guide slots 12d.

The zoom lens 10 is provided around the stationary ring 12 with a first cam ring 17 and a second cam ring 18. The first cam ring 17 is fitted on the large-diameter portion 12a to be freely rotatable about the optical axis O without moving along the optical axis O with respect to the large-diameter portion 12a, and the second cam ring 18 is fitted on the small-diameter portion 12b to be freely rotatable about the optical axis O without moving along the optical axis O with respect to the small-diameter portion 12b. The first cam ring 17 is provided at a rear end thereof with three pairs of engaging projections 17a (see FIG. 2) which project rearwards, while the second cam ring 18 is provided at a front end thereof with three engaging projections 18a (see FIGS. 3 and 4) which project radially outwards to be engaged with the three pairs of engaging projections 17a, respectively, so that the first cam ring 17 and the second cam ring 18 can integrally rotate at all times. The second cam ring 18 is provided on an outer peripheral surface thereof with a rotation transfer projection 18b which is elongated in a direction parallel to the optical axis O. The zoom ring 13 is provided on an inner peripheral surface thereof with a rotation transfer arm 13a which projects radially inwards to be engaged with the rotation transfer projection 18b of the second cam ring 18. Accordingly, manually rotating the zoom ring 13 causes both the first cam ring 17 and the second cam ring 18 to rotate together with the zoom ring 13 due to the engagement of the rotation transfer arm 13a with the rotation transfer projection 18b.

Figure 3:
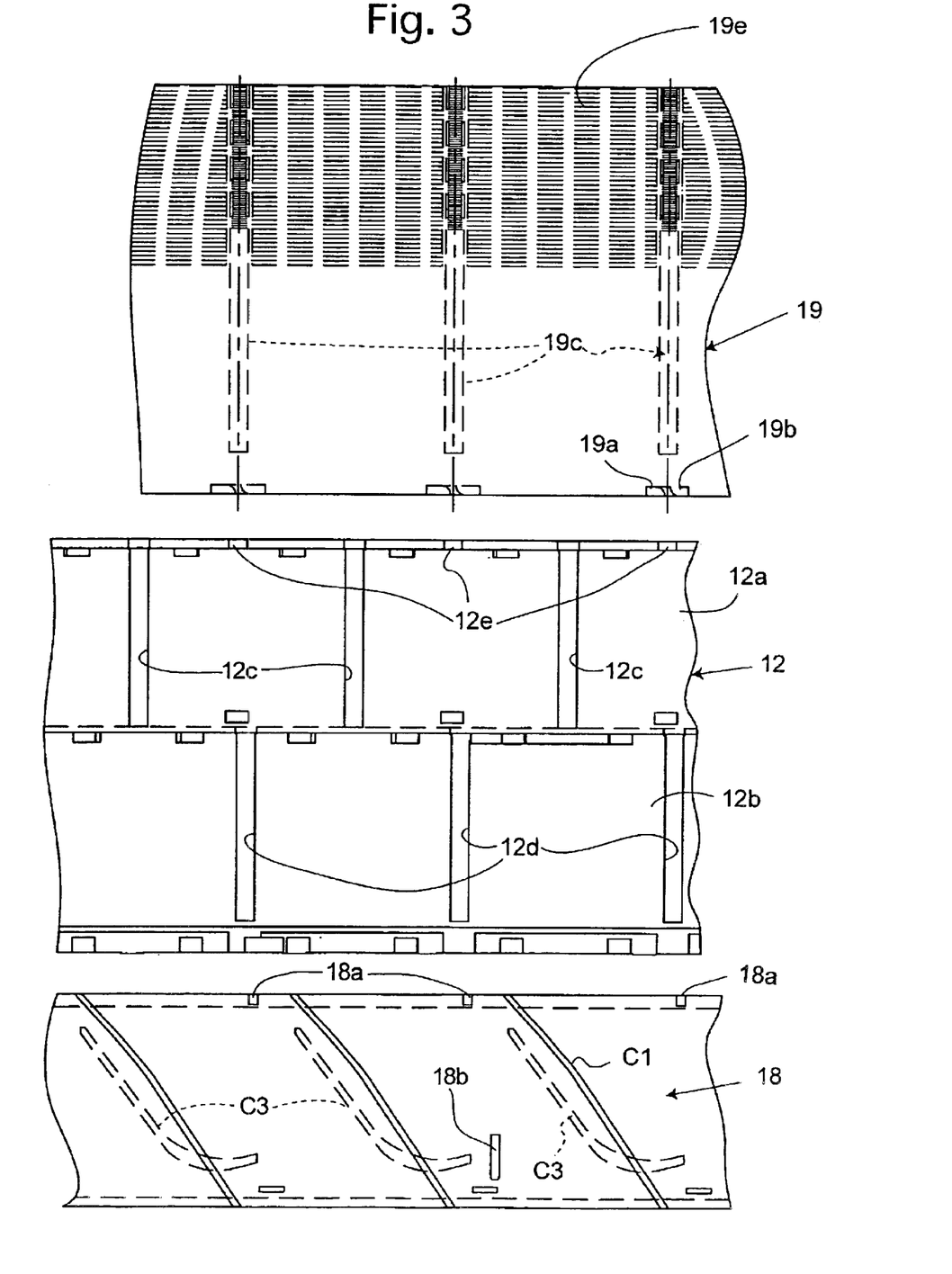
FIG. 3 is an exploded and developed view of a first lens group support ring, the stationary ring and a second cam ring of the zoom lens shown in FIG. 1.
Figure 4:
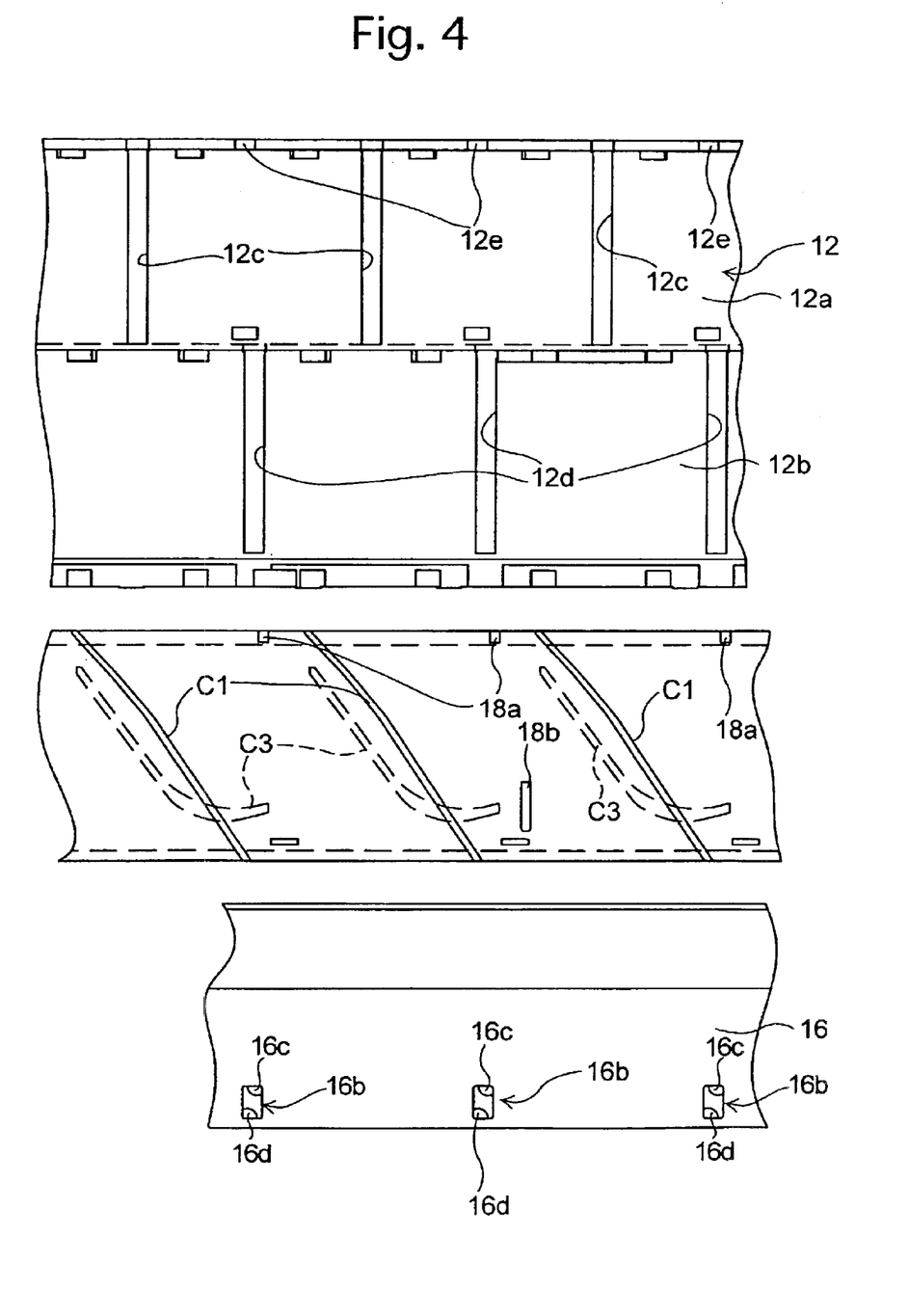
FIG. 4 is an exploded and developed view of the stationary ring, the second cam ring and a third lens group support frame of the zoom lens shown in FIG. 1.

The second cam ring 18 is provided on an outer peripheral surface thereof with three first cam ribs C1, and is provided on an inner peripheral surface of the second cam ring 18 with three third cam ribs C3 (see FIGS. 3 and 4). The first cam ring 17 is provided on an inner peripheral surface thereof with three second cam ribs C2 (see FIG. 2). The zoom lens 10 is provided around the first cam ring 17 and the second cam ring 18 with a first moving ring 19. The first moving ring 19 is provided at the rear end thereof on an inner peripheral surface of the first moving ring 19 with three pairs of cam followers 19a and 19b (see FIG. 3), each pair of which is engaged with the associated first cam rib C1 of the second cam ring 18 in a manner to hold the first cam rib C1 between the pair of cam followers 19a and 19b.

The first moving ring 19 is provided on an inner peripheral surface thereof with three linear guide grooves 19c which extend parallel to the optical axis O. The stationary ring 12 is provided at the front end thereof with three engaging projections 12e (see FIGS. 2 and 3) which are engaged in the three linear guide grooves 19c of the first moving ring 19, respectively. The first moving ring 19 is provided at the front end thereof on an outer peripheral surface of the first moving ring 19 with a male thread portion 19d. The zoom lens 10 is provided around the front of the first moving ring 19 with a first lens group support frame 20. The first lens group support frame 20 is provided on an inner peripheral surface thereof with a female thread portion 20c which is engaged with the male thread portion 19d of the first moving ring 19. The first lens group L1 is fixed to a lens holder 21 which is screwed into the first lens group support frame 20 to be fixed thereto. Accordingly, a rotation of the second cam ring 18 (the zoom ring 13) causes the first moving ring 19 (the first lens group L1), which is guided linearly along the optical axis O without rotating about the optical axis O by the engagement of the three engaging projections 12e with the three linear guide grooves 19c, to move linearly along the optical axis O in accordance with the contours of the three first cam ribs C1.

Each of the three second linear guide projections 16b of the third lens group support frame 16 is provided at the end thereof with a pair of cam followers 16c and 16d, each pair of which is engaged with the associated third cam rib C3 of the second cam ring 18 in a manner to hold the third cam rib C3 between the pair of cam followers 16c and 16d (see FIG. 4). Likewise, each of the three linear guide projections 15a of the second lens group support frame 15 is provided at the end thereof with a pair of cam followers 15b and 15c, each pair of which is engaged with the associated second cam rib C2 of the second cam ring 18 in a manner to hold the second cam rib C2 between the pair of cam followers 15b and 15c (see FIG. 2). Since each of the second lens group support frame 15 and the third lens group support frame 16 is guided linearly along the optical axis by the stationary ring 12 without rotating, a rotation of the first cam ring 17 and the second cam ring 18 (a rotation of the zoom ring 13) causes the second lens group support frame 15 (the second lens group L2) to move along the optical axis O in accordance with the contours of the three second cam ribs C2, and further causes the third lens group support frame 16 (the third lens group L3) to move along the optical axis O in accordance with the contours of the three third cam ribs C3 to perform a zooming operation together with the above described linear movement of the first moving ring 19 (the first lens group L1) in accordance with the contours of the three first cam ribs C1.

The first lens group support frame 20 is provided on an outer peripheral surface thereof with three radial projections 20b (only one of them appears in FIG. 1) which project radially outwards to be engaged in three rotation transfer grooves 14a (only one of them appears in FIG. 1) which are formed on an inner peripheral surface of the focus ring 14 to extend parallel to the optical axis O. Accordingly, manually rotating the focus ring 14 causes the first lens group support frame 20 to move along the optical axis O while rotating about the optical axis O with respect to the first moving ring 19, which is guided linearly along the optical axis O without rotating, due to the engagement of the female thread portion 20c with the male thread portion 19d to perform a focusing operation.

The first cam ring 17 is provided on an outer peripheral surface thereof with a light-shielding knurled surface 17c (see FIG. 1), while the first moving ring 19 is provided, on an inner peripheral surface thereof which faces the light-shielding knurled surface 17c, with a light-shielding knurled surface 19e (see FIGS. 1 and 3) which faces the light-shielding knurled surface 17c.

The third lens group L3 consists of three lens elements: a first lens element L3-1, a second lens element L3-2 and a third lens element L3-3. The hot crimping structure of the zoom lens 10 according to the present invention is applied to a lens supporting structure between the third lens group support frame 16 and the second lens element L3-2 of the third lens group L3.

As shown in FIGS. 5A through 5C and 6, the third lens group support frame 16 is provided between the first lens element L3-1 and the third lens element L3-3 with a lens holder opening 161 for accommodating and holding the second lens element L3-2. The diameter of the lens holder opening 161 corresponds to the diameter of the second lens element L3-2. The third lens group support frame 16 is provided therein at the rear end of the lens hold opening 161 with a radial-inward stepped portion (stop portion) 162 which is engaged with that portion of the rear surface (one side surface) of the second lens element L3-2 adjacent to the rim of the second lens element L3-2 (see FIG. 6). The third lens group support frame 16 is provided immediately in front of the lens holder opening 161 with an outward expansion surface (radial-outward stepped portion) 163 which extends radially outwards from the close vicinity of the front outer edge of the second lens element L3-2 that is inserted into the lens holder opening 161 (i.e., from the front end of the lens holder opening 161) in a state before the outward expansion surface 163 is crimped by a hot crimping tool 30 (see FIG. 2). A conventional thin-walled cylindrical portion, to be crimped by heat, does not have to be formed immediately in front of the lens holder opening 161. The third lens group support frame 16 is provided, in front of the outward expansion surface 163 on an inner peripheral surface of a large-diameter portion of the third lens group support frame 16, with a light-shielding knurled surface 164. The depth of the lens holder opening 161 in the optical axis direction is substantially identical to or slightly greater than the thickness of the rim of the second lens element L3-2. The outward expansion surface 163 lies in a plane orthogonal to the optical axis O.

The hot crimping tool (hot crimping horn) 30 has a general cylindrical shape, and is rotationally symmetrical about the axis of the hot crimping tool 30. The hot crimping tool 30 is provided at the front end thereof with an annular crimping edge 31 having an acute angle in cross section. The outer diameter of the annular crimping edge 31 is greater than the diameter of the lens holder opening 161.

Figure 5A:
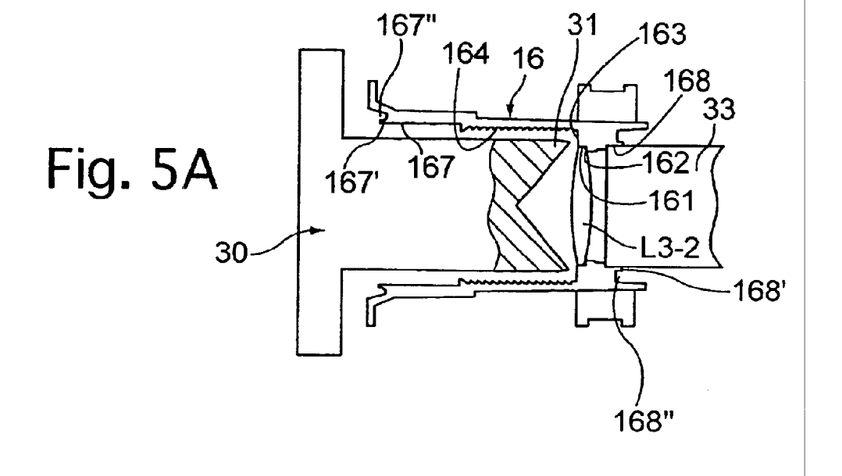
FIGS. 5A through 5C are explanatory views showing the process of crimping a thin-walled cylindrical portion of the third lens group support frame by a hot crimping tool via a hot crimping method according to the present invention.
Figure 5B:
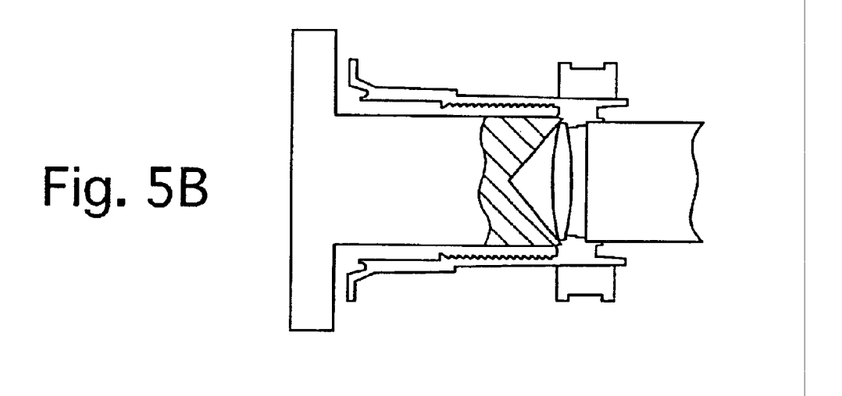
Figure 5C:
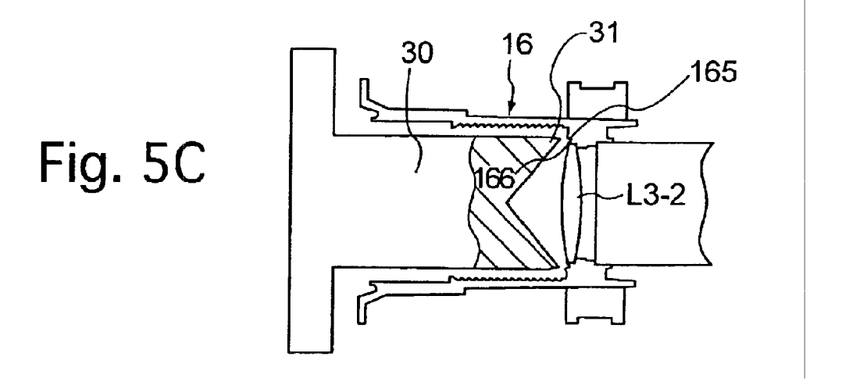

A hot crimping operation with the hot crimping tool 30 to fix the second lens element L3-2 to the third lens group support frame 16, will be hereinafter discussed. As shown in FIG. 5A, the second lens element L3-2 is inserted into the lens holder opening 161 in the right direction, while a cylindrical base 33 is inserted into a rear lens holder opening 168 formed on an inner peripheral surface of the third lens group support frame 16. The rear lens holder opening 168 accommodates and holds the third lens element L3-3. In this state where the second lens element L3-2 and the cylindrical base 33 have been inserted into the lens holder opening 161 and the rear lens holder opening 168, respectively, the hot crimping tool 30, which has been heated to an appropriate temperature, is firstly inserted into the third lens group support frame 16 from the front end thereof so that the annular crimping edge 31 lightly contacts the outward expansion surface 163 with the hot crimping tool 30 and the third lens group support frame 16 being kept coaxial with each other, and is subsequently further moved rearward, against the outward expansion surface 163, so that the annular crimping edge 31 slightly sinks into the outward expansion surface 163. This causes the outward expansion surface 163 to be deformed due to the heat of the annular crimping edge 31 to thereby form an annular recess 165 (see FIGS. 5C and 6) on the outward expansion surface 163. The movement of a melting synthetic resin which is melted due to this formation of the annular recess 165 produces a crimped edge 166 (see FIG. 6) which lies on the portion of the front surface of the second lens element L3-2 adjacent to the rim of the second lens element L3-2 (the portion of the front surface of the second lens element L3-2 on the opposite side of the second lens element L3-2 from the radial-inward stepped portion 162). The second lens element L3-2 is immovably held between the crimped edge 166 and the radial-inward stepped portion 162.

Figure 6:
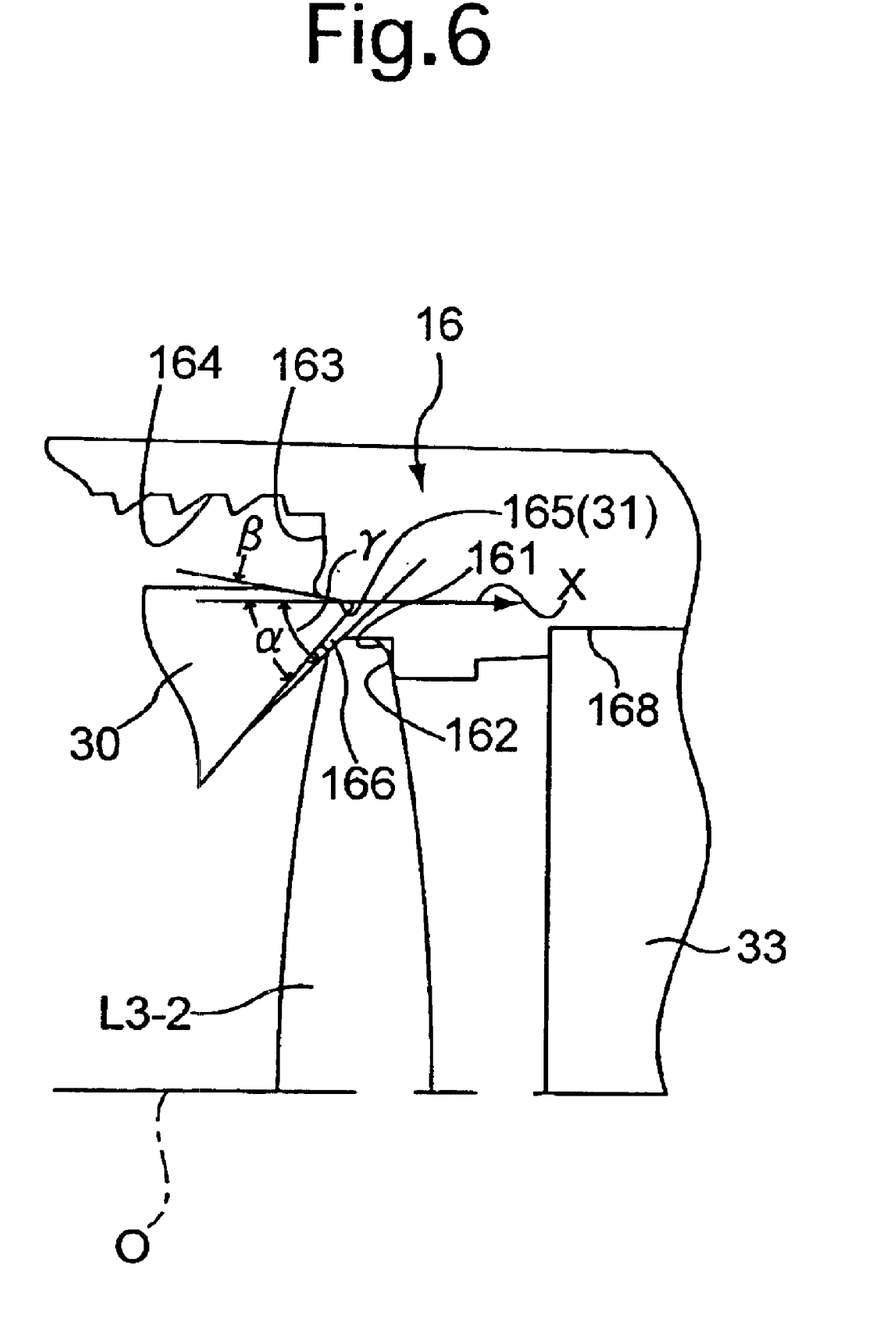
FIG. 6 is an enlarged cross sectional view of a portion of the zoom lens shown in FIG. 1, showing an embodiment of the hot crimping structure according to the present invention.

The shape and the diameter of the annular crimping edge 31 of the hot crimping tool 30 are determined so that the crimped edge 166 is produced to lie on the portion of the front surface of the second lens element L3-2 adjacent to the rim of the second lens element L3-2 in the above described manner. More specifically, as shown in FIG. 6, the angle of a cross section of the tip of the annular crimping edge 31 between the inner surface of the tip and a moving direction X of the hot crimping tool 30 is designated as α, and the angle of the tip of the cross section of the annular crimping edge 31 between the outer surface of the tip and the moving direction X of the hot crimping tool 30 is designated as β. It is desirable that the angle α be identical to or greater than a chamfered angle γ of the second lens element L3-2 and that the angle β be parallel to the moving direction X (the optical axis direction) (i.e., the angle β be zero degree) or in between approximately five to ten degrees. These conditions for the angles α and β makes it easy for the crimped edge 166 to be produced by the movement of a melting portion of the synthetic resin comprising the third lens group support frame 16. For example, a good result was produced when the angles α and β were set to 45 degrees and 0 degrees, respectively. According to the present embodiment of the hot crimping structure, the degree of precision in alignment of the axis of the hot crimping tool 30 and the optical axis of the second lens element L3-2 does not need to be as high as that of the prior art, when the annular crimping edge 31 of the hot crimping tool 30 is brought in contact with the outward expansion surface 163, because the annular crimping edge 31 only has to produce the crimped edge 166 by movement of the melting portion on the outward expansion surface 163 which is melted by the heat of annular crimping edge 31. In a case where the outward expansion surface 163 is so flexible in shape so as to be shaped as a truncated conical surface which tapers in a direction forwards along the optical axis O (leftwards as viewed in FIG. 6), a melting portion on the outward expansion surface 163 which is necessary for producing the crimped edge 166 can easily move to produce the crimped edge 166.

Figure 7:
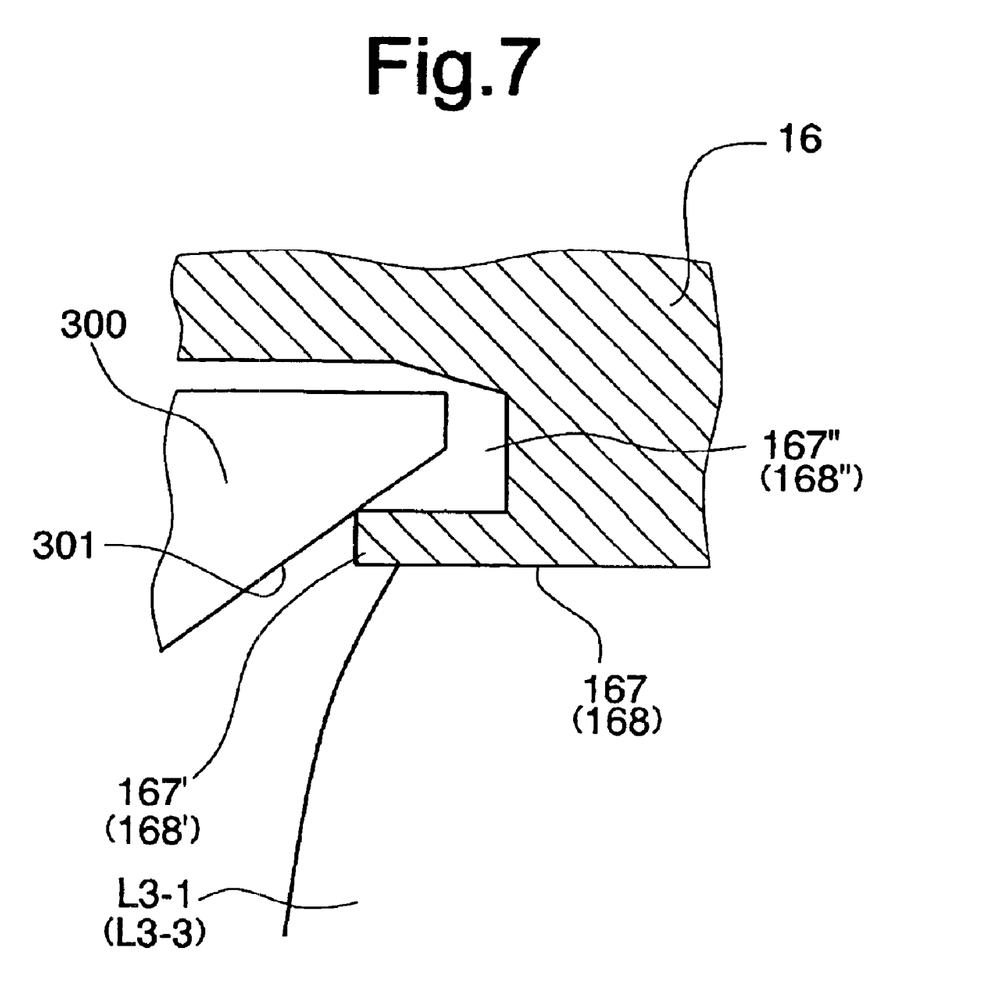
FIG. 7 is an enlarged cross sectional view of a portion of a conventional hot crimping structure.

Each of the first lens element L3-1 and the third lens element L3-3 is fixed to the third lens group support frame 16 by a conventional hot crimping structure. A front lens holder opening 167 for accommodating and holding the first lens element L3-1 and the aforementioned rear lens holder opening 168 for accommodating and holding the third lens element L3-3 are formed on a front inner peripheral surface and a rear inner peripheral surface of the third lens group support frame 16, respectively. The third lens group support frame 16 is provided at the front end of the front lens holder opening 167 with a front thin-walled cylindrical portion 167', and is further provided at the rear end of the rear lens holder opening 168 with a rear thin-walled cylindrical portion 168'. Each of the front thin-walled cylindrical portion 167' and the rear thin-walled cylindrical portion 168' is crimped by a conventional hot crimping tool 300 (see FIG. 7). The conventional hot crimping tool 300 is provided inside the front end thereof with an annular conical surface 301 which is brought into contact with an outer peripheral surface of each of the front thin-walled cylindrical portion 167' and the rear thin-walled cylindrical portion 168'. According to this conventional hot crimping structure, a clearance recess 167" and a clearance recess 168" for the conventional hot crimping tool 300 must be formed on the third lens group support frame 16 around the front thin-walled cylindrical portion 167' and the rear thin-walled cylindrical portion 168', respectively. Unlike this structure, either such a thin-walled cylindrical portion or such a clearance recess does not have to be formed on the third lens group support frame 16 in the present embodiment of the zoom lens 10. In addition, the degree of precision in alignment of the axis of the conventional hot crimping tool 300 and the optical axis of the first lens element L3-1 or the third lens element L3-3 must be very high to bring into contact the conical surface 301 of the conventional hot crimping tool 300 with an outer peripheral surface of the front thin-walled cylindrical 167' or the rear thin-walled cylindrical 168' uniformly. In contrast to this, according to the present invention, the degree of precision in alignment of the axis of the hot crimping tool 30 and the optical axis of the second lens element L3-2 does not need to be as high.

Although a single lens element (the second lens element L3-2) is accommodated and held in the lens holder opening 161 in the above illustrated embodiment of the hot crimping structure, a cemented lens group consisting of more than one lens element can be accommodated and held in the lens holder opening 161. The present invention can also be applied to the case where more than one lens element (lens group) is accommodated and held in a lens holder opening of a lens frame via a spacer or a similar member.

The present invention can be applied not only to an interchangeable zoom lens such as the above described embodiment of the interchangeable zoom lens shown in FIGS. 1 through 4, but also to a hot crimping structure of any other device in general.

As can be understood from the foregoing, according to the present invention, a hot crimping structure fixing a lens to a lens frame and a hot crimping method of fixing a lens to a lens frame are achieved, wherein the lens frame does not have to be provided with either the aforementioned thin-walled cylindrical portion or any clearance recess for the hot crimping tool, and the degree of precision in alignment of the axis of the hot crimping tool and the optical axis of the lens when the hot crimping tool is brought into contact with the thin-walled cylindrical portion can be reduced. In addition, a hot crimping tool for fixing a lens to a lens frame is achieved, wherein the hot crimping tool does not require that the lens frame be provided with a clearance recess for the hot crimping tool.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A hot crimping structure for fixing at least one lens element to a lens frame made of synthetic resin, said lens element being accommodated in a lens holder opening of said lens frame, a portion of said lens frame being crimped by heat to serve as a crimped edge which lies on a surface of said lens element adjacent to a rim of said lens element, wherein said lens frame comprises an outward expansion surface which extends outwards from a close vicinity of said rim of said lens element, and wherein a hot crimping tool is brought into contact with said outward expansion surface to form a recess on said outward expansion surface by heat, to thereby produce said crimped edge by movement of melting synthetic resin which is melted due to the formation of said recess.

2. The hot crimping structure according to claim 1, wherein said outward expansion surface lies in a plane orthogonal to an axis of said lens element.

3. The hot crimping structure according to claim 1, wherein said outward expansion surface is formed as a substantially truncated conical surface which is rotation-symmetrical about an axis of said lens element.

4. The hot crimping structure according to claim 1, wherein said lens frame comprises a stop portion formed on an inner peripheral surface of said lens frame in said lens holder opening, and wherein said rim of said lens element is held tight between said crimped edge and said stop portion.

5. The hot crimping structure according to claim 1, wherein said recess is formed as an annular recess on said outward expansion surface so that said crimped edge is produced as an annular crimped edge.

6. The hot crimping structure according to claim 1, wherein said lens frame comprises another lens holder opening provided adjacent to said lens holder opening, said another lens holder opening having a diameter greater than a diameter of said lens holder opening, and wherein another lens element having a diameter greater than a diameter of said lens element is accommodated in said another lens holder opening.

7. A hot crimping method of fixing at least one lens element to a lens frame made of synthetic resin, a lens holder opening for accommodating said lens element being formed on said lens frame, an inward stepped portion which is engaged with that portion of one side surface of said lens element adjacent to a rim of said lens element being formed on said lens frame in said lens holder opening, a portion of said lens frame being crimped by heat to serve as a crimped edge which lies on the portion of the other side surface of said lens element adjacent to said rim of said lens element, wherein said hot crimping method comprises: forming an outward expansion surface on an inner peripheral surface of said lens frame so that said outward expansion surface extends outwards from a close vicinity of said rim of said lens element;

preparing a hot crimping tool including an annular crimping edge having an acute angle in cross section, an outer diameter of said annular crimping edge being greater than a diameter of said lens holder opening; and bringing said hot crimping tool into contact with said outward expansion surface to form a recess on said outward expansion surface by heat of said hot crimping tool to thereby produce said crimped edge by movement of melting synthetic resin which is melted due to the formation of said recess.

8. The hot crimping method according to claim 7, wherein said outward expansion surface lies in a plane orthogonal to an axis of said lens element.

9. The hot crimping method according to claim 7, wherein said outward expansion surface is formed as a substantially truncated conical surface which is rotation-symmetrical about an axis of said lens element.

10. A hot crimping tool for fixing at least one lens element to a lens frame made of synthetic resin, said lens element being accommodated in a lens holder opening of said lens frame, said hot crimping tool being brought into contact with a portion of said lens frame to crimp said portion by heat of said hot crimping tool so as to produce a crimped edge which lies on a surface of said lens element adjacent to a rim of said lens element, wherein said hot crimping tool comprises an annular crimping edge which is formed at an end of said hot crimping tool to have an acute angle in cross section, and wherein said annular crimping edge is inserted into said lens frame in a direction substantially orthogonal to a radial direction of said lens frame, and is brought into contact with said portion of said lens frame to form a recess to thereby produce said crimped edge by a movement of a melting synthetic resin which is melted due to said formation of said recess.

11. The hot crimping tool according to claim 10, wherein said hot crimping tool is rotationally symmetrical about an axis of said lens element.

* * * * *